(12) United States Patent
Erlacher et al.

(10) Patent No.: US 10,737,729 B2
(45) Date of Patent: Aug. 11, 2020

(54) VEHICLE

(71) Applicant: MAGNA STEYR Fahrzeugtechnik AG & Co KG, Graz (AT)

(72) Inventors: Manuel Erlacher, Radenthein (AT); Reinhard Hoermann, Hitzendorf (AT); Franz Planka, St. Andrae (AT); Harald Zachnegger, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 174 days.

(21) Appl. No.: 15/875,145

(22) Filed: Jan. 19, 2018

(65) Prior Publication Data

US 2018/0229772 A1 Aug. 16, 2018

(30) Foreign Application Priority Data

Feb. 14, 2017 (EP) ..................................... 17156001
May 15, 2017 (EP) ..................................... 17171027

(51) Int. Cl.
*B62D 21/15* (2006.01)
*B60K 1/04* (2019.01)
*B62D 25/20* (2006.01)

(52) U.S. Cl.
CPC .............. *B62D 21/157* (2013.01); *B60K 1/04* (2013.01); *B62D 25/2036* (2013.01); *B60K 2001/0427* (2013.01); *B60K 2001/0438* (2013.01); *B60Y 2306/01* (2013.01)

(58) Field of Classification Search
CPC ......... B62D 21/15; B62D 21/157; B60K 1/04
See application file for complete search history.

(56) References Cited

U.S. PATENT DOCUMENTS

| 8,960,776 B2* | 2/2015 | Boettcher | B62D 33/023 |
| | | | 296/193.07 |
| 10,259,506 B2* | 4/2019 | Ayukawa | B62D 25/2036 |
| 2009/0134668 A1 | 5/2009 | Oezkan et al. | |

(Continued)

FOREIGN PATENT DOCUMENTS

| DE | 102010045997 A1 * | 11/2011 | .............. B60K 1/04 |
| DE | 102010045997 A1 | 11/2011 | |
| DE | 102013016824 A1 | 4/2015 | |

OTHER PUBLICATIONS

Sascha Weczerek, Electrically operated motor vehicle has central tunnel, in which electric battery is arranged in battery case, where battery case and central tunnel are strengthened for protection of electric battery, Nov. 10, 2011, EPO, DE102010045997A1, English Abstract (Year: 2011).*

(Continued)

*Primary Examiner* — James A English
(74) *Attorney, Agent, or Firm* — Jordan IP Law, LLC; Todd A. Vaughn

(57) ABSTRACT

A vehicle that includes seat cross-members arranged opposite each other on both sides of a center tunnel defining a space, a battery device as an energy accumulator for an electric drive motor of the vehicle, the battery device including a battery housing which at least partially fills the space in the center tunnel, and a load path optimization component arranged in the battery housing at the space of the center tunnel, to transmit forces laterally from one seat cross-member to the other seat cross-member.

18 Claims, 10 Drawing Sheets

(56) References Cited

U.S. PATENT DOCUMENTS

| | | | |
|---|---|---|---|
| 2010/0001553 A1* | 1/2010 | Yoda | B62D 21/157 |
| | | | 296/193.07 |
| 2010/0119931 A1* | 5/2010 | Shishido | H01M 2/1072 |
| | | | 429/153 |
| 2013/0075173 A1* | 3/2013 | Kato | B60K 1/04 |
| | | | 180/68.5 |
| 2017/0305248 A1* | 10/2017 | Hara | B60L 50/66 |
| 2018/0208038 A1* | 7/2018 | Ozawa | B60K 1/04 |
| 2018/0257713 A1* | 9/2018 | Faruque | B60K 17/00 |
| 2018/0334196 A1* | 11/2018 | Erlacher | B62D 27/065 |
| 2019/0009661 A1* | 1/2019 | Okamura | B60K 1/04 |

OTHER PUBLICATIONS

Sascha Weczerek, Electrically operated motor vehicle has central tunnel, in which electric battery is arranged in battery case, where battery case and central tunnel are strengthened for protection of electric battery, Nov. 10, 2011, EPO, DE102010045997A1, Machine Translation of Description (Year: 2011).*

* cited by examiner

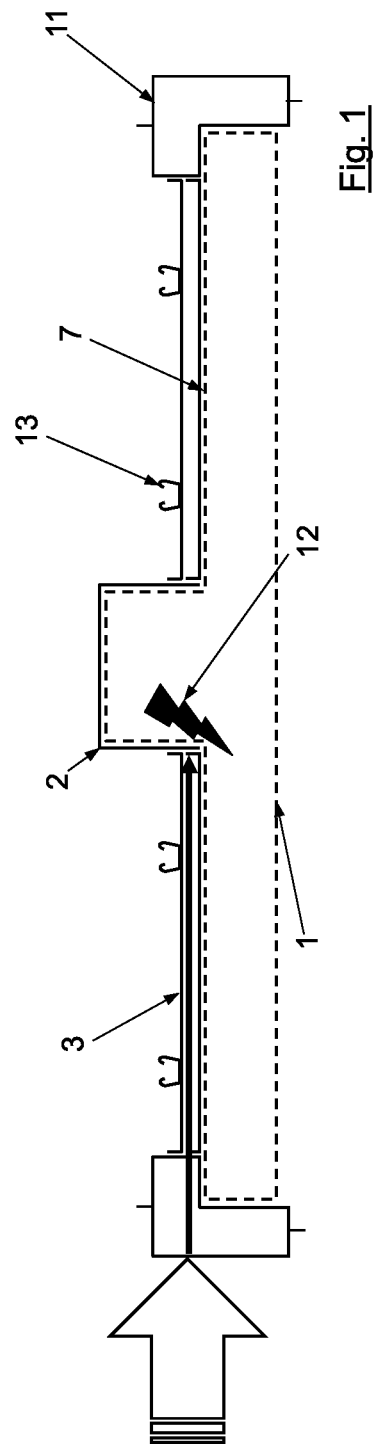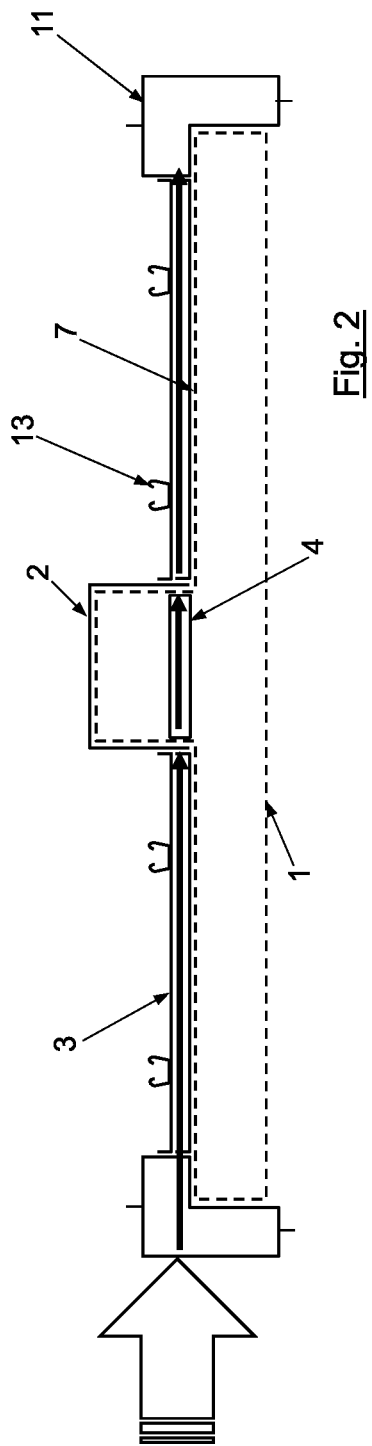

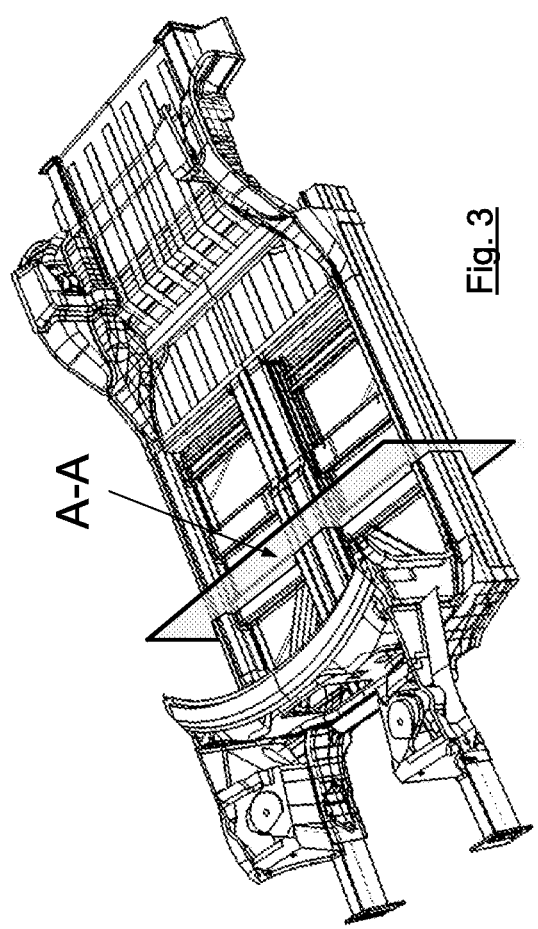

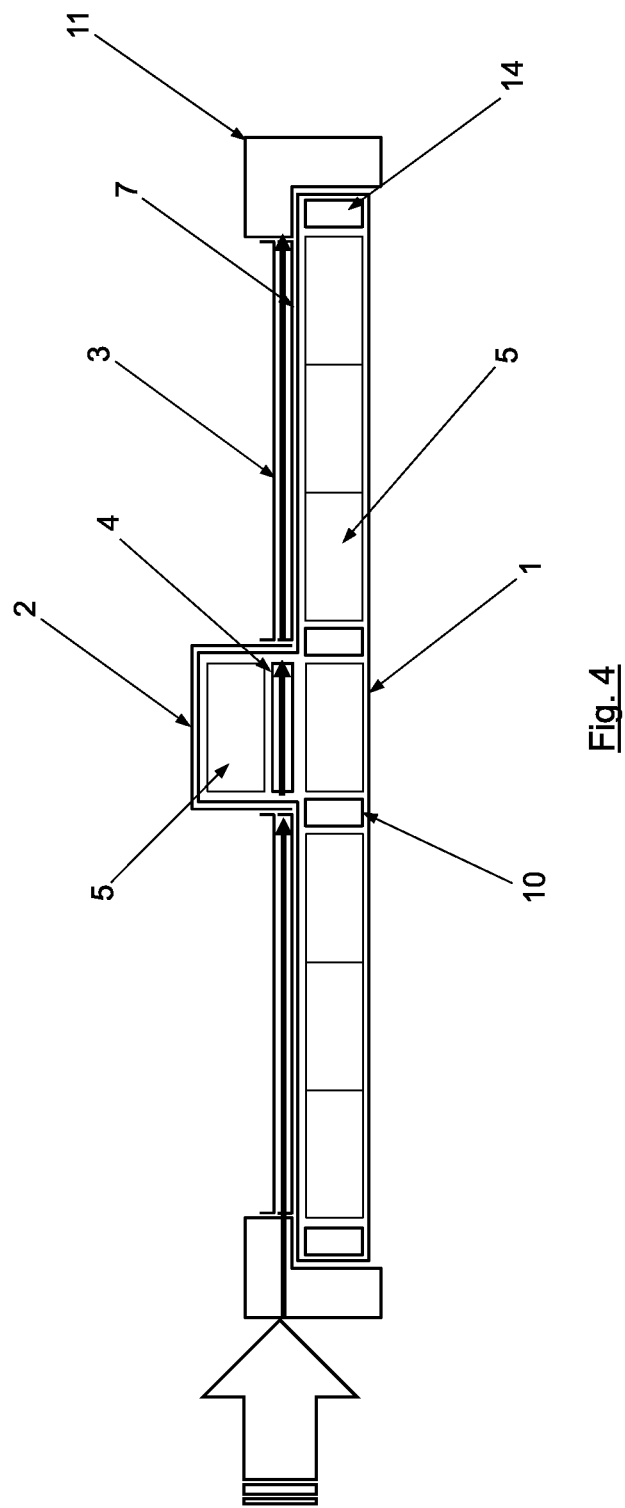

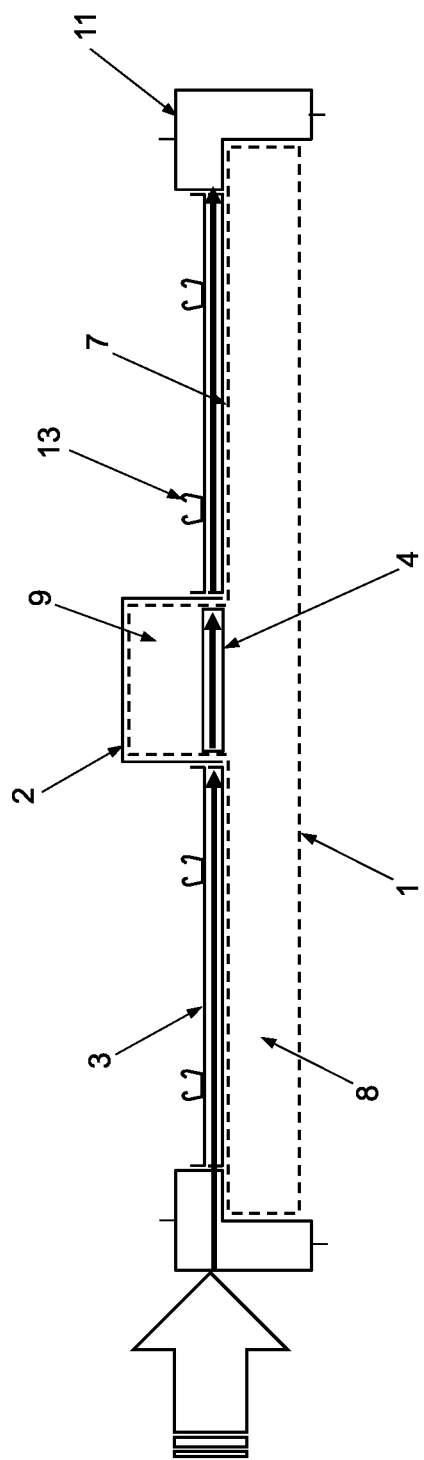

VEHICLE

CROSS-REFERENCE TO RELATED APPLICATIONS

The present application claims priority under 35 U.S.C. § 119 to European Patent Application Nos. EP 17156001.4 (filed on Feb. 14, 2017) and EP 17171027.0 (filed on May 15, 2017), which are each hereby incorporated by reference in their respective entireties.

TECHNICAL FIELD

Embodiments relate to a vehicle comprising an electric drive motor and a battery device as an energy accumulator for the electric drive motor, i.e., in particular, an electric or hybrid vehicle.

BACKGROUND

Electric or hybrid vehicles comprising a battery device for supplying a drive motor usually require relatively large battery devices which must be accommodated on the vehicle in the most space-saving manner possible. It is known to utilize, for this purpose, the space close to an underbody of the vehicle and, in particular, also in a center tunnel of the underbody, which is often required for accommodating a drive shaft.

The utilization of such a space in a center tunnel of a vehicle has the disadvantage, however, that, in the event of a lateral impact on the vehicle (a "side crash"), the tunnel walls represent a weak point and, therefore, a risk for a battery device located behind the walls, since the load that occurs is only very slightly absorbed or conducted further, due to the nature of the tunnel walls and the geometric design thereof.

FIG. 1 illustrates a cross-sectional view of the underbody area of a related art vehicle that has a collapsing structure 12 in the area of the center tunnel 2 during a side crash of the vehicle. The lateral forces occurring on the seat cross-members 3 can effectuate a destruction of tunnel walls of the center tunnel 2 and of the battery device 1, since the forces impact the relatively weak tunnel walls and, there, cannot be sufficiently dissipated.

SUMMARY

In accordance with embodiments, a vehicle that address the aforementioned problems, and, in particular, which increases the safety of a battery device which is situated in the area of a center tunnel of the vehicle.

In accordance with embodiments, a vehicle comprises an electric drive motor; a battery device as an energy accumulator for the electric drive motor, and which includes a battery housing which at least partially fills the space available in a center tunnel of the vehicle; seat cross-members situated opposite each other arranged on both sides of the center tunnel; a load path optimization component arranged in the battery housing, within the space available in the center tunnel of the vehicle, in such a way that lateral forces are to be transmitted via the load path optimization component from one seat cross-member to the opposite seat cross-member.

In accordance with embodiments, a load path optimization component is installed within the battery device, specifically in the battery housing. The load path optimization component being configured to transmit lateral forces from one seat cross-member to an opposite seat cross-member. Such transmission of forces takes place in both directions, via the chain seat cross-member—load path optimization component—seat cross-member in each case. The load path optimization component must therefore have a sufficient mechanical strength in order to be capable of further conducting forces that occur to a greater extent than, for example, the tunnel walls of a center tunnel.

To this end, the seat cross-members are situated opposite each other, i.e., to the left and the right of the center tunnel, and therefore, are essentially aligned with respect to each other. In order to transmit loads from the seat cross-members, at least the ends of the load path optimization component are likewise situated opposite the ends of the seat cross-members, and therefore, are essentially likewise aligned with the seat cross-members, and/or the cross-section of the load path optimization component projects beyond the cross-sections of the seat cross-members. The load path optimization component can therefore support, in particular, the walls of the center tunnel on the inner side thereof, in the case of a crash, and, in the case of a side crash, can form a stiff load path in combination with the seat cross-members.

The battery device can also be easily installed in the vehicle, in particular, from below, due to the arrangement of the load path optimization component within the battery device.

In accordance with embodiments, the load path optimization component is mounted in the center between two seat cross-members. The load path optimization component is to represent an extension or a projection of the seat cross-members and, in this way, connects the load path of the seat cross-members.

In particular, the load path optimization component, in contrast to the center tunnel, can essentially have a straight shape or cross-section connecting the two sides of the center tunnel, such as, for example, the shape of a plate.

In accordance with embodiments, the load path optimization component can be formed as an extruded part, and in particular, composed of a metal such as aluminum. Particularly preferably, the extruded part can comprise braces, in particular in the form of a framework structure.

In accordance with embodiments, the load path optimization component can also be a folding part, and composed of steel. In particular, the folding part can have an essentially U-shaped cross-section.

In accordance with embodiments, at least one battery module of the battery device in the battery housing is fastened on the load path optimization component, in particular, being bolted onto the load path optimization component.

In accordance with embodiments, at least one battery module above the load path optimization component and within the space available in the center tunnel of the vehicle is fastened on the load path optimization component.

In accordance with embodiments, alternatively or additionally, at least one battery module is fastened at the bottom of the load path optimization component.

In accordance with embodiments, the load path optimization component can be directly fastened, in particular bolted, on the seat cross-member, and therefore, the load path takes place at least not exclusively via the tunnel walls of the center tunnel toward the load path optimization component, but rather at least partially directly from the seat cross-members toward the load path optimization component.

In accordance with embodiments, the load path optimization component can also be fastened on a base panel, in particular being bolted thereon.

In accordance with embodiments, the load path optimization component can comprise a projection, wherein the load path optimization component located in the battery housing is fastened, preferably bolted, on a seat cross-member and/or a base panel via the projection.

In accordance with embodiments, the load path optimization component can extend at least essentially from one wall of the battery housing up to the opposite wall of the battery housing. These walls of the battery housing may be situated parallel to and directly adjacent to respective walls of the center tunnel. Small open spaces can also exist between the load path optimization component and the walls of the center tunnel, which facilitate the installation of the battery device.

In accordance with embodiments, the lower edge of the load path optimization component is preferably situated approximately at the level of a base panel, in particular, a floor panel, of the vehicle, and the upper edge of the load path optimization component is situated approximately at the level of the seat cross-members. A "base panel" can be not only a planar component in this case, but rather can also be structured, for example having curves and edges. The base panel can also be designed to be integral with the center tunnel. The base panel can be made of metal, although this is not required.

In accordance with embodiments, the battery device comprises a flat accumulator which is situated under a base panel of the vehicle, and a further accumulator area which is situated above the base panel and above the load path optimization component, within the space available in the center tunnel of the vehicle. The flat accumulator may extend across a large portion of the width or essentially the entire width of the vehicle. The flat accumulator, in combination with the further accumulator area, can essentially have a "T" cross-section.

In accordance with embodiments, longitudinal beams and/or door sills are situated on both sides of the center tunnel, and therefore, the longitudinal beams and/or door sills support the load path across the seat cross-members and the load path optimization component.

In accordance with embodiments, the load path optimization component can also comprise cavities which are utilized as coolant ducts of the battery device.

DRAWINGS

Embodiments will be illustrated by way of example in the drawings and explained in the description below.

FIG. 1 illustrates a cross-sectional view of the underbody area of a vehicle of the related art.

FIG. 2 illustrates a cross-sectional view of the underbody area of a vehicle having a load path optimization component in the battery device, in accordance with embodiments.

FIG. 3 illustrates a three-dimensional representation of a bodyshell and shows the location of the section A-A.

FIG. 4 illustrates a detailed cross-sectional view of the underbody area of the vehicle according to A-A of FIG. 3.

FIG. 5 illustrates a cross-sectional view of the underbody area of the vehicle comprising a first shape instance of the battery device, according to A-A of FIG. 3.

DESCRIPTION

Figure 6:
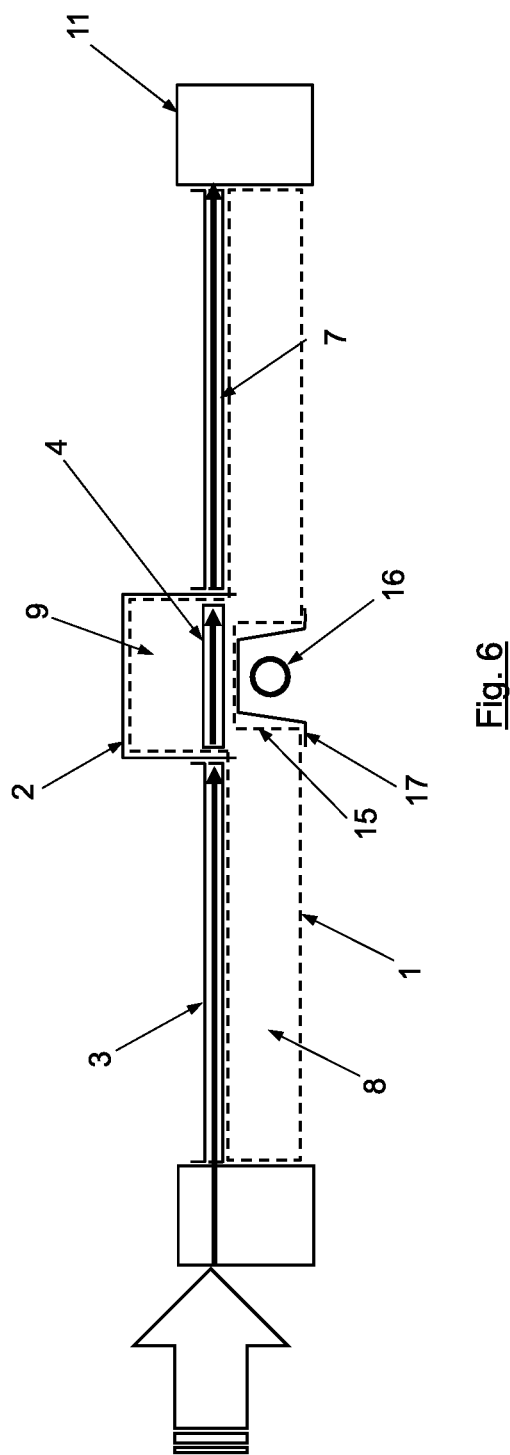
FIG. 6 illustrates a cross-sectional view of the underbody area of the vehicle comprising a second shape instance of the battery device, according to A-A of FIG. 3.

As illustrated in FIG. 2, in accordance with embodiments, a load path optimization component 4 is arranged in the battery device within the battery housing 1. Therefore, the load path optimization component 4 lies within a space available in the center tunnel 2 of the vehicle. The load path optimization component 4 is mounted in the center between two seat cross-members 3 in such a way that lateral forces (indicated by the arrow shown on the left in FIGS. 1 and 2) are transmitted via the load path optimization component 4 from one seat cross-member 3 (for example, to the left of the center tunnel 2 in FIG. 2) to the opposite seat cross-member 3 (for example, to the right of the center tunnel 2 in FIG. 2). The seat cross-members 3 are situated opposite each other, i.e., approximately in alignment with each other. Due to the load path optimization component 4, the walls of the center tunnel 2 are supported on the inner side thereof in the case of a lateral crash, since a load path is formed by the load path optimization component 4 (indicated by the arrow in the load path optimization component 4), which load path can divert the forces of one seat cross-member 3 (indicated by the arrow between the seat cross-members 3 and the base panel 7) to the opposite seat cross-member 3.

The load path optimization component 4 lies approximately coplanar to the seat cross-members 3 and/or the base panel 7, and extends between the plane of the seat cross-members 3 and the base panel 7. In a longitudinal direction of the vehicle, the load path optimization component 4 may be arranged at least in the longitudinal area, in which the seat cross-members 3 are present (see, for example, FIG. 11), although it can also extend considerably beyond this longitudinal area.

Seat rails 13 can be mounted on the seat cross-member 3.

Figure 9:
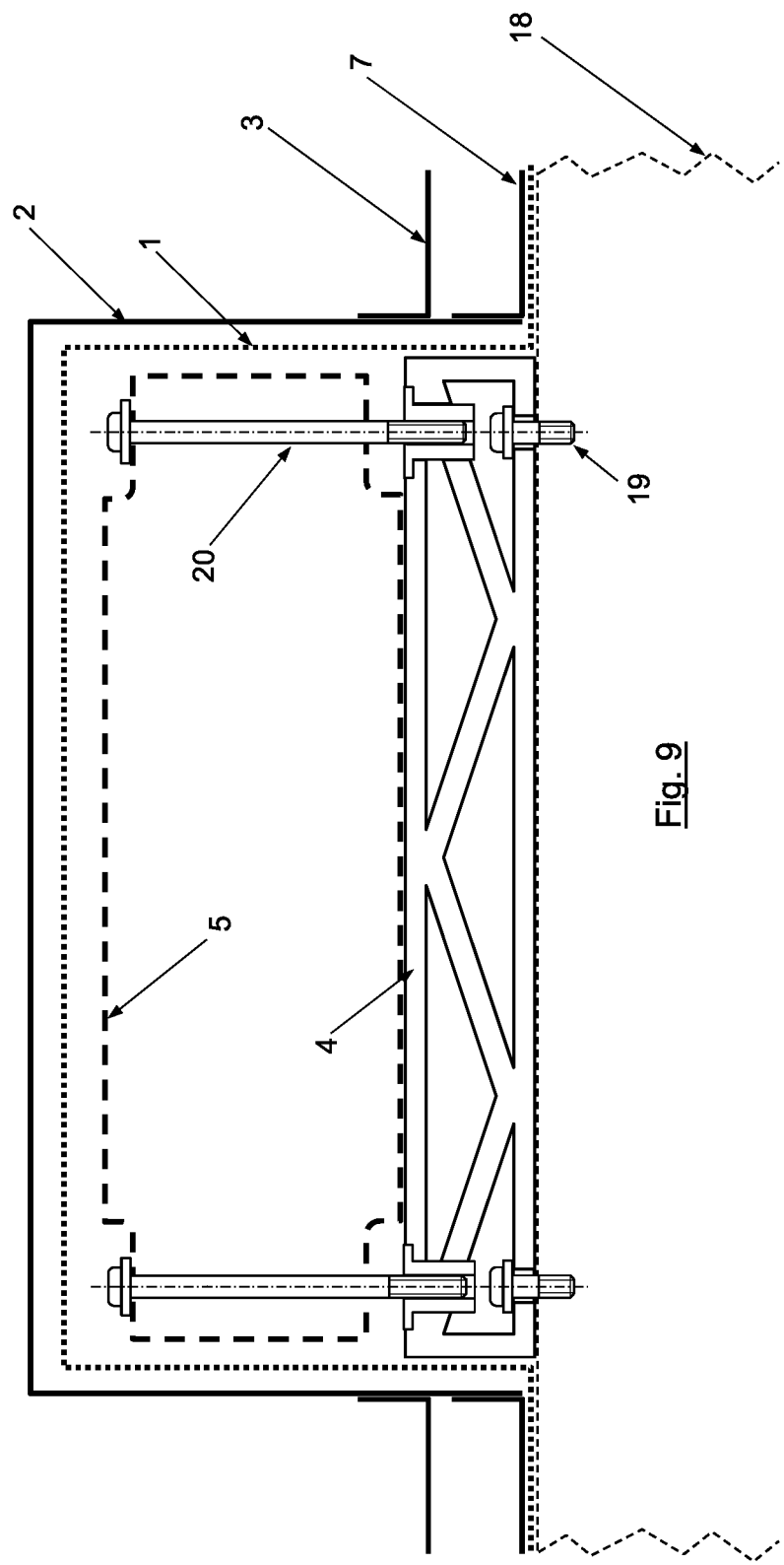
FIG. 9 illustrates a cross-sectional view around the center tunnel of the vehicle in a first fastening instance of the battery device, according to B-B of FIG. 8.
Figure 10:
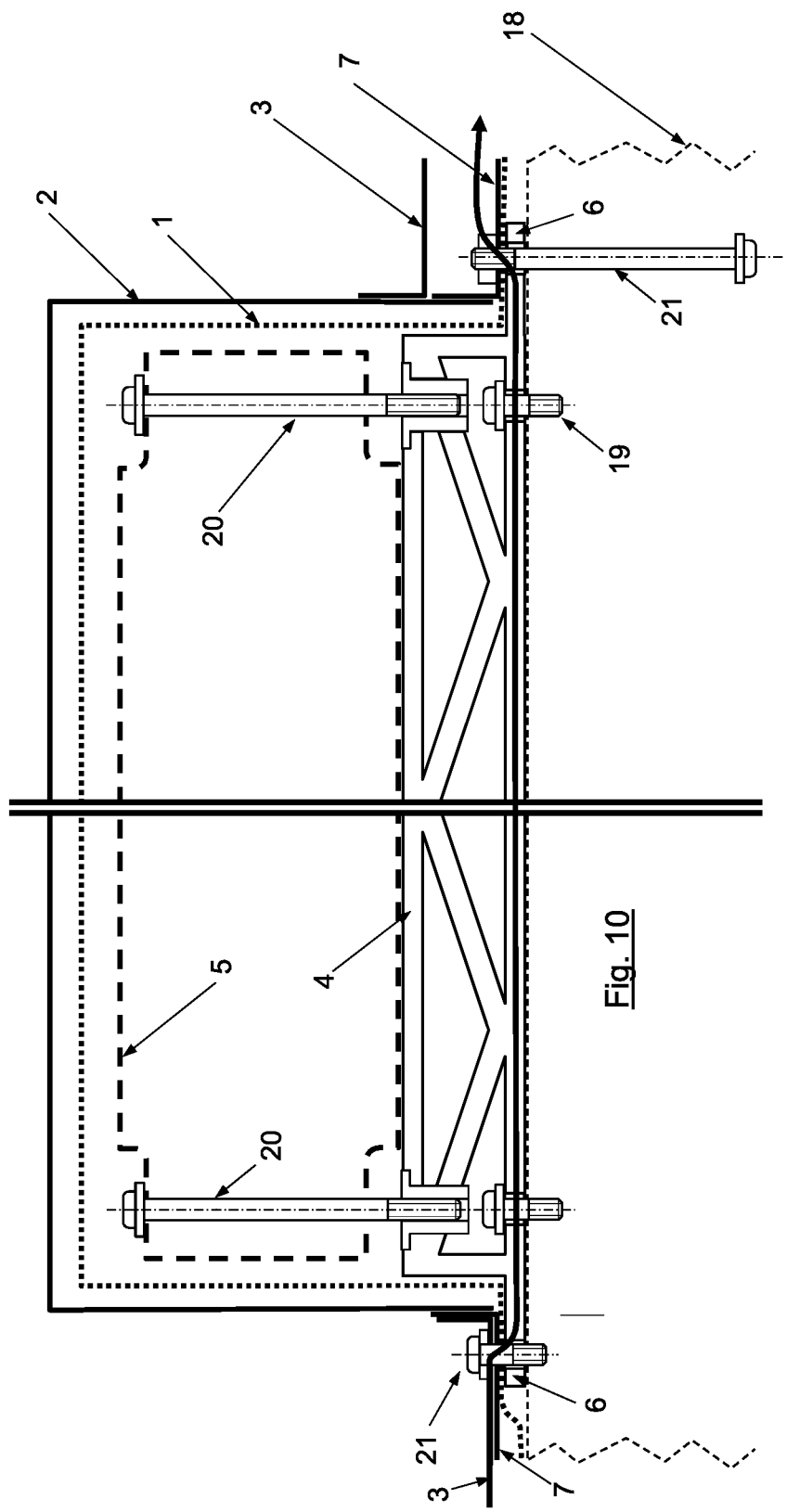
FIG. 10 illustrates a cross-sectional view around the center tunnel of a vehicle in a second fastening instance of the battery device (left image half) and in a third fastening instance (right image half), according to B-B of FIG. 8.

As illustrated in FIGS. 9 and 10, the load path optimization component 4 can be composed of an extruded material, in particular, a metal such as aluminum.

Figure 11:
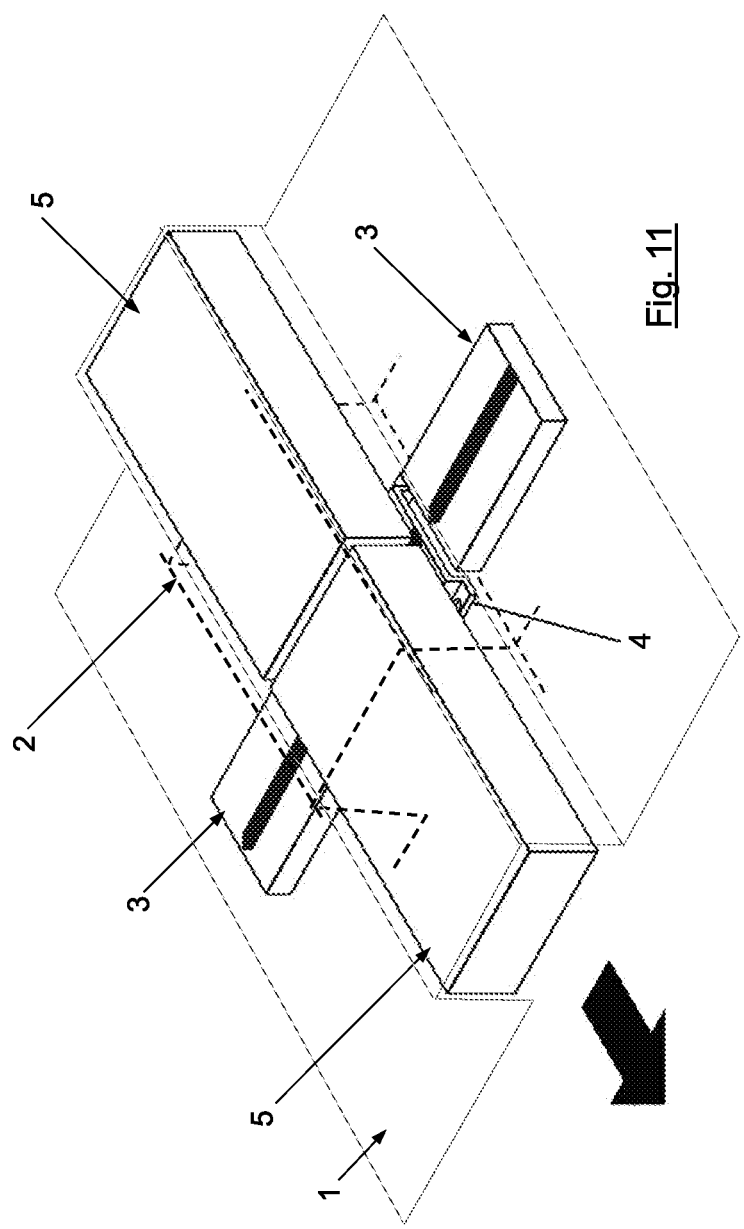
FIG. 11 illustrates an isometric representation of the underbody area of a vehicle, in accordance with embodiments.

As illustrated in FIG. 11, the load path optimization component 4 can be a folding component composed of steel.

As illustrated in FIG. 3, a vehicle bodyshell, in particular, a platform, the location of the section A-A which is shown in greater detail in the different variants in FIGS. 4 to 7.

As is apparent in FIG. 4, a battery device can comprise a plurality of battery modules 5 within the battery housing 1 and an externally peripheral, supporting battery frame 14. One battery module 5 of the battery device can be fastened within the battery housing 1 on the load path optimization component 4. At least one battery module 5 can be situated spatially above the load path optimization component 4 and within the space available in the center tunnel 2 of the vehicle, in particular being fastened on and/or over the load path optimization component 4.

One or a plurality of battery modules 5 can also be situated spatially below the load path optimization component 4, such as below a base panel 7, and can likewise be fastened on and/or over the load path optimization component 4, for example. The battery modules 5 situated at the bottom can form, in combination, a flat accumulator 8. The flat accumulator 8 can extend across approximately the entire width of the vehicle. In combination with a battery module 5 above the load path optimization component 4, as a further accumulator area 9, the battery device can therefore approximately have an upside-down "T" cross-section.

The aforementioned design of the battery device and of the battery housing 1, comprising a lower, flat accumulator 8 region, and an upper accumulator region 9 located in the center tunnel 2, which, overall, forms an inverted "T" shape, is readily apparent in FIG. 5.

As illustrated in FIG. 6, Aa battery housing 1 having such a shape can comprise a bulge 15 under the center tunnel 2, i.e., approximately in the center of the vehicle in the transverse direction of the vehicle, in order to provide open space for an exhaust gas system 16 and/or other components, such as, for example, drive components or cabling. A shielding plate 17 can be provided between the bulge 15 of the battery housing 1 and the exhaust gas system 16 or other components.

Figure 7:
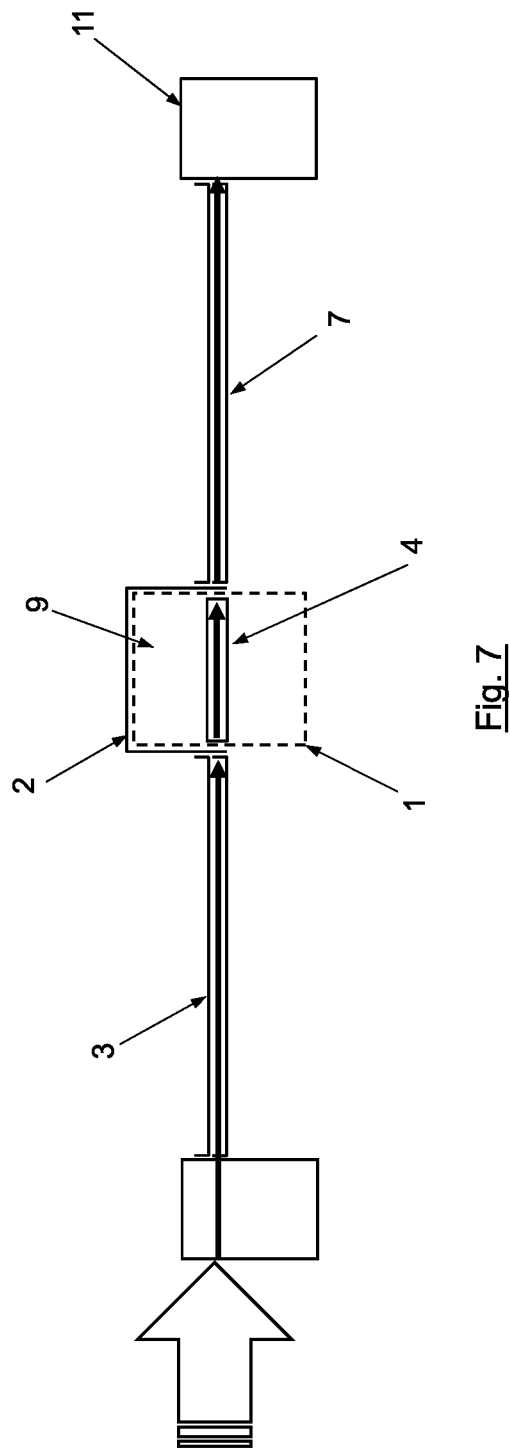
FIG. 7 illustrates a cross-sectional view of the underbody area of the vehicle comprising a third shape instance of the battery device, according to A-A of FIG. 3.

As illustrated in FIG. 7, the battery device can also have a more compact shape which takes up less space horizontally than a flat accumulator. In particular, the battery device can have approximately the same width below the load path optimization component 4 as above the load path optimization component 4 in the space in the center tunnel 2 and, therefore, can be formed only in the tunnel area and can have an approximately rectangular or square shape.

Figure 8:
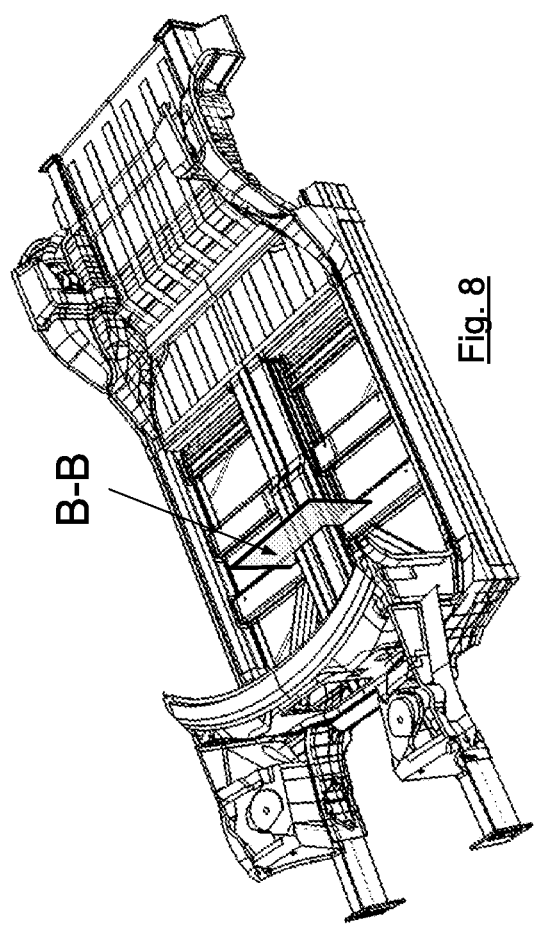
FIG. 8 illustrates a isometric representation of a bodyshell and the location of the section B-B, in accordance with embodiments.

As illustrated in FIG. 8, a bodyshell of a vehicle in accordance with embodiments, the location of the more detailed section B-B which is represented in FIGS. 9 and 10.

The load path optimization component 4 is extruded in this case and comprises a framework structure which provides for good transmission of the load path. The load path optimization component 4 is directly fastened, via a bolted connection 19, on a battery cross-member 18 under the load path optimization component 4. Furthermore, the battery module 5 above the load path optimization component 4 is directly fastened to the load path optimization component by means of a bolted connection 20.

FIG. 10 illustrates a cross-sectional view around the center tunnel of a vehicle in accordance with embodiments, according to B-B of FIG. 8, in a second fastening instance of the battery device (left image half) and in a third fastening instance (right image half). The load path optimization component 4 comprises, in both variants, a projection 6 for a bolted connection 21 to the battery cross-member 18, in addition to or alternatively to the bolted connection 19. In the variant shown on the right, the base panel 7 is additionally bolted on with the aid of this bolted connection 21, whereas this applies for both the base panel 7 and the seat cross-member 3 in the variant shown on the left.

The load path is illustrated again in FIG. 10 as a continuous arrow for a force impacting from the left. The load path optimization component 4 is therefore directly fastened on the seat cross-member 3, and therefore the load path takes place at least not exclusively via the tunnel walls of the center tunnel 2 toward the load path optimization component 4, but rather at least partially directly from the seat cross-members 3 toward the load path optimization component 4.

FIG. 11 illustrates a three-dimensional representation of the underbody area of a vehicle in accordance with embodiments. In this variant, the load path optimization component 4 is formed by a folding part. The folding part is a folding profile which extends from one seat cross-member 3 in the direction toward the opposite seat cross-member 3. The load path through the load path optimization component 4, which is indicated as an arrow, extends in the transverse direction again, normal with respect to the direction of travel of the vehicle, which is likewise represented as an arrow, at the lower left in FIG. 11. The same design of seat cross-member 3—load path optimization component 4—seat cross-member 3, which is represented in FIG. 11, can be implemented in a vehicle, for example both on front seat cross-members 3 and on rear seat cross-members 3.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LISTING OF REFERENCE SYMBOLS 1 battery housing
2 center tunnel
3 seat crossmember
4 load path optimization component
5 battery module
6 projection
7 base panel
8 lower, flat accumulator
9 upper accumulator
10 longitudinal beam
11 door sill
12 collapsing structure
13 seat rail
14 battery frame
15 bulge
16 exhaust gas system
17 shielding plate
18 battery cross-member
19 bolted connection of battery cross-member
20 bolted connection of battery module
21 bolted connection of load path optimization component

What is claimed is:

1. A vehicle, comprising:
an electric drive motor;
seat cross-members arranged opposite each other on both sides of a center tunnel defining a space;
a battery device as an energy accumulator for the electric drive motor, the battery device including a battery housing which at least partially fills the space in the center tunnel; and
a load path optimization component, comprising an extruded component composed of aluminum or a folding component composed of steel, arranged to longitudinally extend in the battery housing at the space of the center tunnel as an extension of the seat cross-members and transmit forces laterally from one seat cross-member to the other seat cross-member.

2. The vehicle of claim 1, further comprising at least one battery module arranged within the battery housing and directly fastened to the load path optimization component.

3. The vehicle of claim 1, further comprising at least one battery module arranged above and directly fastened to the load path optimization component and within the space of the center tunnel.

4. The vehicle of claim 1, wherein the load path optimization component is directly fastened on at least one of the seat cross-members such that a load path takes place non-exclusively via walls of the center tunnel toward the load path optimization component, but rather at least partially directly from the seat cross-members toward the load path optimization component.

5. The vehicle of claim 2, wherein the load path optimization component comprises a projection to permit fastening of the load path optimization component to one of the seat cross-members and/or a base panel of the vehicle.

6. The vehicle of claim 1, wherein the load path optimization component is configured to extend from a first wall of the battery housing to an opposite second wall of the battery housing.

7. The vehicle of claim 6, wherein the first wall and the second wall of the battery housing are arranged parallel to and directly adjacent to corresponding walls of the center tunnel.

8. The vehicle of claim 1, wherein a lower edge of the load path optimization component is arranged substantially coplanar to a base panel of the vehicle.

9. The vehicle of claim 8, wherein an upper edge of the load path optimization component is arranged substantially coplanar to a level of the seat cross-members.

10. The vehicle of claim 1, wherein the battery device comprises:
a first accumulator region arranged under a base panel of the vehicle; and
a second accumulator region arranged above the base panel and the load path optimization component, within the space available in the center tunnel of the vehicle.

11. The vehicle of claim 10, wherein the second accumulator region is arranged in the space of the center tunnel of the vehicle.

12. The vehicle of claim 1, further comprising door sills arranged on both sides of the center tunnel, and configured to support a load path across the seat cross-members and the load path optimization component.

13. The vehicle of claim 1, wherein the load path optimization component comprises cavities which are utilized as coolant ducts of the battery device.

14. The vehicle of claim 1, wherein the load path optimization component is directly fastened to:
the seat cross-members via first fastening connectors,
a battery cross-member arranged under the load path optimization component via second fastening connectors, and
at least one battery module within the battery housing via third fastening connectors.

15. A vehicle, comprising:
seat cross-members including a first seat cross-member and a second seat cross-member;
a center tunnel arranged between the first seat cross-member and the second seat cross-member, the center tunnel having walls to define a space configured to extend above an uppermost plane of the seat cross-members;
a battery device as an energy accumulator, the battery device including a battery housing arranged below the seat cross-members and in the space of the center tunnel; and
a load path optimization component, arranged in the battery housing at the space of the center tunnel directly fastened at both ends thereof via first fastening connectors to the seat cross-members as an extension of the seat cross-members to transmit forces laterally through the battery housing between the first seat cross-member and the second seat cross-member.

16. The vehicle of claim 15, wherein the load path optimization component is directly fastened to:
a battery cross-member arranged under the load path optimization component via second fastening connectors; and
at least one battery module within the battery housing via third fastening connectors.

17. A vehicle, comprising:
seat cross-members arranged opposite each other on both sides of a center tunnel defining a space;
a battery device including a battery housing which at least partially fills the space in the center tunnel; and
a load path optimization component, arranged in the battery housing directly fastened at both ends thereof via first fastening connectors to the seat cross-members as an extension of the seat cross-members to transmit forces laterally through the battery housing from one seat cross-member to the other seat cross-member; and
door sills, arranged on both sides of the center tunnel, to support a load path across the seat cross-members and the load path optimization component.

18. The vehicle of claim 17, wherein the load path optimization is directly fastened to:
a battery cross-member arranged under the load path optimization component via second fastening connectors; and
at least one battery module within the battery housing via third fastening connectors.

* * * * *